United States Patent [19]

Hirano et al.

[11] Patent Number: 5,525,092
[45] Date of Patent: Jun. 11, 1996

[54] DEVICE FOR PREVENTING IDLE ROTATION IN CYLINDRICAL INGOT GRINDER

[75] Inventors: Yoshihiro Hirano, Vancouver, Wash.; Seiichi Terashima; Masao Kita, both of Gunma-ken, Japan

[73] Assignee: Shin-Etsu Handotai Co., Ltd., Tokyo, Japan

[21] Appl. No.: 197,338

[22] Filed: Feb. 16, 1994

[30]     Foreign Application Priority Data

Feb. 18, 1993  [JP]  Japan ................... 5-052992

[51] Int. Cl.⁶ .................................................. B24B 49/00
[52] U.S. Cl. ........................... 451/5; 451/10; 451/24; 451/49; 451/385; 451/407; 451/410; 82/1.11; 82/148
[58] Field of Search ............................. 451/5, 6, 8, 10, 451/11, 24, 49, 365, 385, 242, 246, 397, 398, 407, 408, 410; 82/1.11, 142, 148

[56]         References Cited

U.S. PATENT DOCUMENTS

| 2,660,842 | 12/1953 | Balsiger | 451/397 |
|---|---|---|---|
| 3,618,270 | 6/1970 | Koide | 451/398 |
| 4,335,633 | 6/1982 | Boffelli | 451/398 |

Primary Examiner—Bruce M. Kisliuk
Assistant Examiner—Eileen P. Morgan
Attorney, Agent, or Firm—Ronald R. Snider

[57]            ABSTRACT

When a cylindrical single crystal ingot terminating in generally conical parts at the opposite ends thereof is machined with a cylindrical grinder which is adapted to support the ingot in place by fastening the conical parts of the ingot to a spindle side chuck and a tailstock side chuck severally provided with a conical hole and grind and finish the cylindrical part of the ingot while keeping the ingot driven on the spindle side, the ingot is liable to produce idle rotation possibly to the extent of disrupting the grinding work. A device for preventing the ingot from producing this idle rotation is provided which comprises revolution number detecting means adapted to be fastened to the tailstock side chuck and consequently allowed to detect the revolution number thereof, pressing means for pressing the ingot in the axial direction thereof through the medium of the tailstock side chuck, and control means adapted to compare the revolution number of a spindle with the revolution number found by the revolution number detecting means and effect due control of the pressing means when the difference between the two revolution numbers surpasses a prescribed threshold. The due control effected by the control means is utilized additionally or exclusively for the purpose of stopping the driving on the spindle side in one modified embodiment.

9 Claims, 7 Drawing Sheets

DEVICE FOR PREVENTING IDLE ROTATION IN CYLINDRICAL INGOT GRINDER

BACKGROUND OF THE INVENTION

1. Field of the Invention

This invention relates to a device for preventing idle rotation in a cylindrical ingot grinder, which device is used ideally in the operation of grinding a cylindrical part of a single crystal ingot for the purpose of preventing the ingot from being misshapen in consequence of the possible phenomenon of idle rotation.

2. Prior Art Statement

The semiconductor substrates to be used in semiconductor integrated circuits are manufactured by centering a single crystal ingot produced in the general shape of a round bar by such a single crystal growing method as the Czochralski method, grinding the cylindrical part of the ingot with a cylindrical grinder to finish it in a prescribed diameter, cutting the single crystal ingot perpendicularly to the axial direction thereof to obtain disklike substrates, and subjecting the substrates to the works of lapping, etching, polishing, etc.

A single crystal ingot 1 which terminates in generally conical parts 2 and 3 at the opposite ends thereof as illustrated in FIG. 8 is centered by machining to form between the generally conical parts 2 and 3 a cylindrical part 4 destined to be ground. Thus, the generally conical parts 2 and 3 and the cylindrical part 4 of the single crystal ingot 1 are both in a state deformed with a rough surface when the ingot 1 is subjected to the centering work. When the cylindrical part 4 is to be ground and finished by the use of a cylindrical grinder, either of the generally conical parts 2 and 3 is supported on a fast head stock side and the remainder on a foot stock side and the single crystal ingot 1 is rotated with a drive motor on the spindle side.

Since the conical parts 2 and 3 have a rough surface as mentioned above, however, an attempt to hold the single crystal ingot 1 as centered calls for a special device. The method of holding a given ingot by the opposite terminals thereof as illustrated in FIG. 9 has found popular acceptance to date. To be specific, this method comprises preparing a spindle side chuck and a tailstock side chuck containing a tapered hole having a smaller angle of inclination than the angle of inclination of the conical parts 2 and 3, mounting these chucks fast respectively on the fast head stock side and the foot stock side, and setting the single crystal ingot 1 fast in place for the sake of the work of grinding with the generally conical parts 2 and 3 thereof kept in tangential contact with the tapered holes.

During the work of grinding, the single crystal ingot 1 is rotated from the fast head stock side with the generally conical parts 2 and 3 thereof kept in tangential contact with the tapered holes of the spindle side chuck and the tailstock side chuck as described above. Since the supporting force produced jointly by the spindle side chuck and the tailstock side chuck is not sufficient for the purpose of keeping the single crystal ingot 1 conveniently for the work of grinding, the rotation from the fast head stock side is not transmitted infallibly to the single crystal ingot 1. There are times when the single crystal ingot 1 fails to rotate at all.

Even when the single crystal ingot 1 is rotated at all, slippage occurs between the spindle side chuck and the single crystal ingot 1 and, as a consequence, the revolution number of the spindle is not wholly transmitted to the single crystal ingot 1. The method under discussion, therefore, is at a disadvantage in suffering the single crystal ingot 1 to rotate at a far smaller revolution number than that of the rotation from the spindle side.

Further, since slippage is liable to occur between the tailstock side chuck and the single crystal ingot 1, the state of contact between the tapered hole of the tailstock side chuck and the generally conical part 3 of the single crystal ingot 1 varies. Because of this unsteady state of contact coupled with the rough surface of the generally conical part 3, the method entails the problem that the single crystal ingot 1 will vibrate during the work of grinding.

The decrease in the revolution number and the vibration prevent the work of cylindrical grinding from being fulfilled with high accuracy. The problem, therefore, arises that the attempt to manufacture semiconductor substrates with high quality ends up in failure. For the sake of attaining the work of grinding the single crystal ingot 1 advantageously, there has been heretofore followed the practice of keeping the state of rotation of the single crystal ingot under visual observation and keeping watch against the possible occurrence of vibration in the single crystal ingot and adjusting the pressing force exerted on the single crystal ingot along the axial direction thereof in due respect of the outcome of the visual observation so as to repress 3 the possible slippage between the two chucks and the generally conical parts 2 and 3 to the fullest possible extent.

SUMMARY OF THE INVENTION

This method, however, encounters difficulty in precisely keeping the single crystal ingot under prescribed conditions. For the method to accomplish advantageously the manufacture of semiconductor substrates with high accuracy, therefore, the problem ensues that the work involved therein dictates a highly advanced skill on the part of a worker and consumes time greatly. The present invention, initiated by the urge to solve the problems mentioned above, has for its object the provision of a device for preventing a cylindrical ingot grinder from producing idle rotation, which device permits manufacture of semiconductor substrates of high quality by automatically preventing the revolution number of a single crystal ingot under treatment from falling below a prescribed level owing to such adverse factors as slippage and enabling the work of cylindrical grinding to proceed with high accuracy.

BRIEF DESCRIPTION OF THE DRAWINGS

The invention will be better understood and the objects and features thereof will become apparent when consideration is given to the following detailed description thereof, which makes reference to the annexed drawings wherein.

DETAILED DESCRIPTION OF PREFERRED EMBODIMENTS

Figure 1:
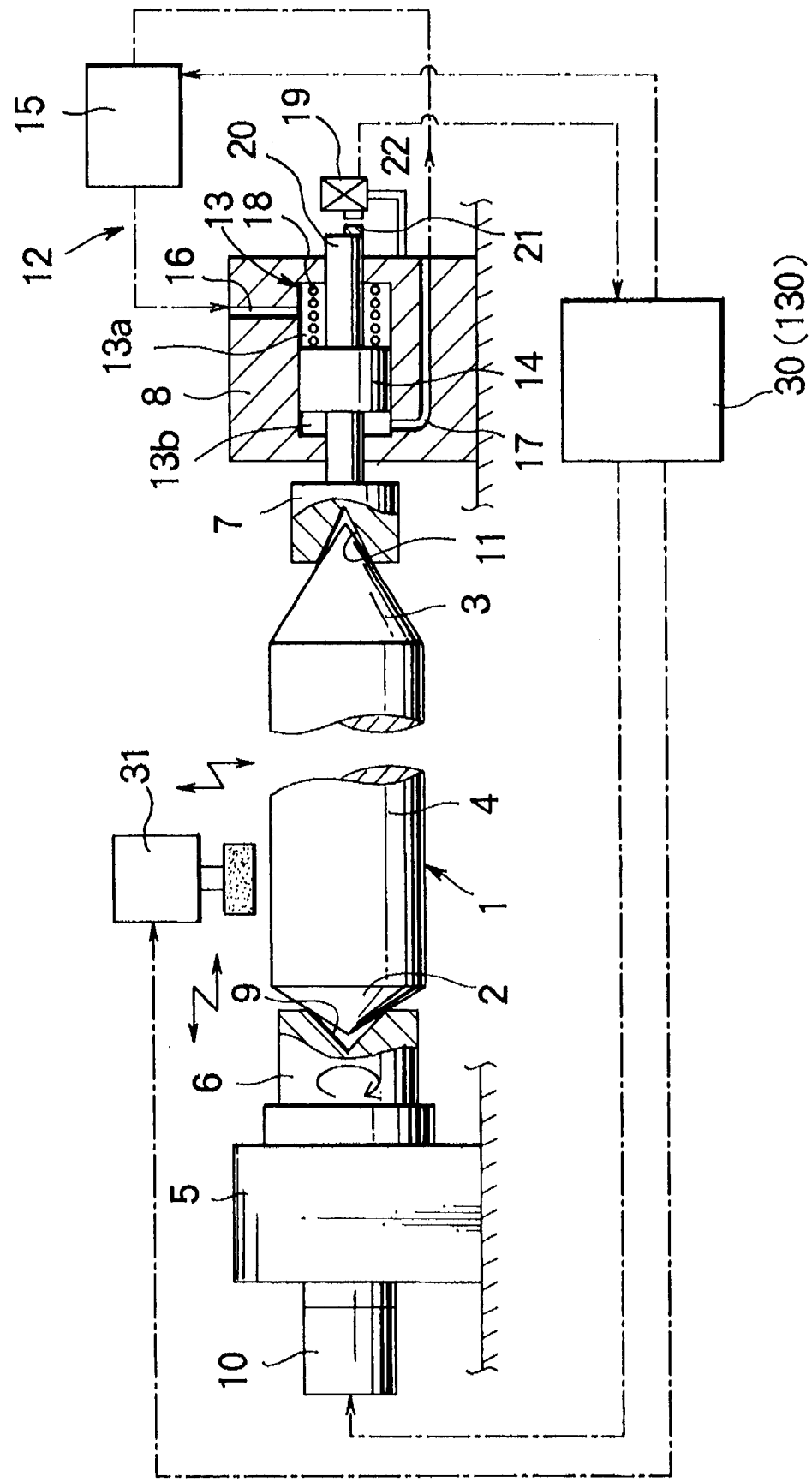
FIG. 1 is a diagram illustrating the general construction of one embodiment of this invention.

The first aspect of this invention accomplishes the object described above by providing a device for preventing idle rotation from occurring in a cylindrical single crystal ingot terminating in generally conical parts at the opposite ends thereof while the ingot is being ground by a cylindrical grinder adapted to support the ingot in place by fastening the conical parts of the ingot to a spindle side chuck and a tailstock side chuck severally provided with a conical hole and grind and finish the cylindrical part of the ingot while keeping the ingot driven on the spindle side, which device comprises revolution number detecting means adapted to be fastened to the tailstock side chuck and consequently allowed to detect the revolution number thereof, pressing means for pressing the ingot in the axial direction thereof through the medium of the tailstock side chuck, and control means adapted to compare the revolution number of a spindle with the revolution number found by the revolution number detecting means and effect due control of the pressing means when the difference between the two revolution numbers surpasses a prescribed threshold.

The second aspect of this invention accomplishes the object described above by providing a device for preventing idle rotation from occurring in a cylindrical single crystal ingot terminating in generally conical parts at the opposite ends thereof while the ingot is being ground by a cylindrical grinder adapted to support the ingot in place by fastening the conical parts of the ingot to a spindle side chuck and a tailstock side chuck severally provided with a conical hole and grind and finish the cylindrical part of the ingot while keeping the ingot driven on the spindle side, which device comprises revolution number detecting means adapted to be fastened to the tailstock side chuck and consequently allowed to detect the revolution number thereof, pressing means for pressing the ingot in the axial direction thereof through the medium of the tailstock side chuck, and control means adapted to compare the revolution number of a spindle with the revolution number found by the revolution number detecting means and effect due control of the pressing means when the difference between the two revolution numbers surpasses a prescribed threshold and, at the same time, stop the driving on the spindle side when the pressing force surpasses a prescribed 6 threshold.

The third aspect of this invention accomplishes the object described above by providing a device for preventing idle rotation from occurring in a cylindrical single crystal ingot terminating in generally conical parts at the opposite ends thereof while the ingot is being ground by a cylindrical grinder adapted to support the ingot in place by fastening the conical parts of the ingot to a spindle side chuck and a tailstock side chuck severally provided with a conical hole and grind and finish the cylindrical part of the ingot while keeping the ingot driven on the spindle side, which device comprises revolution number detecting means adapted to be fastened to the tailstock side chuck and consequently allowed to detect the revolution number thereof, pressing means for pressing the ingot in the axial direction thereof through the medium of the tailstock side chuck, and control means adapted to compare the revolution number of a spindle with the revolution number found by the revolution number detecting means and effect due control to stop the driving on the spindle side when the difference between the two revolution numbers surpasses a prescribed threshold.

Further, the object is accomplished by a device for preventing idle rotation from occurring in a single crystal ingot being machined with a cylindrical ingot grinder, wherein the control means effects the due control so long as the difference between the revolution number on the spindle side and the actual revolution number of the single crystal ingot exceeds the lower limit of 1%.

In the device which, as set forth in the first aspect of this invention, prevents idle 7 rotation from occurring in the ingot being machined with a cylindrical ingot grinder, the revolution number on the spindle side is detected, and the revolution number of the tailstock side chuck is detected by the revolution number detecting means. The control means compares the two revolution numbers and then compares the difference between the two revolution number with a predetermined threshold. When the difference surpasses the threshold, the control means controls and adjusts the pressing force of the pressing means and continues the controlling operation automatically until the difference decreases below the threshold.

In the device which, as set forth in the second aspect of this invention, prevents idle rotation from occurring in the ingot being machined with a cylindrical ingot grinder, when the difference of the revolution numbers surpasses the threshold, the adjustment of the pressing force is continued until the difference of the revolution numbers decreases below the threshold so long as the pressing force remains below the prescribed threshold. When the pressing force surpasses the threshold, the control means stops the driving on the spindle side, carries out a measure to eliminate a deviation, if any, of the machining of the generally conical parts of the ingot or the chucking positions of the generally conical parts and right the state of chucking, and thereafter renews the fastening of the ingot to the opposite chucks. The control means controls and adjusts the pressing force of the pressing means and continues the controlling operation automatically until the pressing force decreases below the threshold.

In the device which, as set forth in the third aspect of this invention, prevents idle rotation from occurring in the ingot being machined with a cylindrical ingot grinder, when the difference of the revolution numbers surpasses the threshold, when the difference between the two revolution numbers surpasses the threshold, the control means effects due control so as to stop the driving on the spindle side. After effecting this stop, the control means carries out a measure to eliminate a deviation, if any, of the machining of the generally conical parts of the ingot or the chucking positions of the generally conical parts and right the state of chucking, and thereafter makes due adjustment and renews the fastening of the ingot to the opposite chucks so as to decrease the difference between the two revolution numbers below the threshold. Then the grinder resumes the cylindrical grinding operation.

In consequence of the operation of the device of this invention performed as described above, the single crystal ingot is allowed to rotate at the prescribed revolution number.

Figure 2:
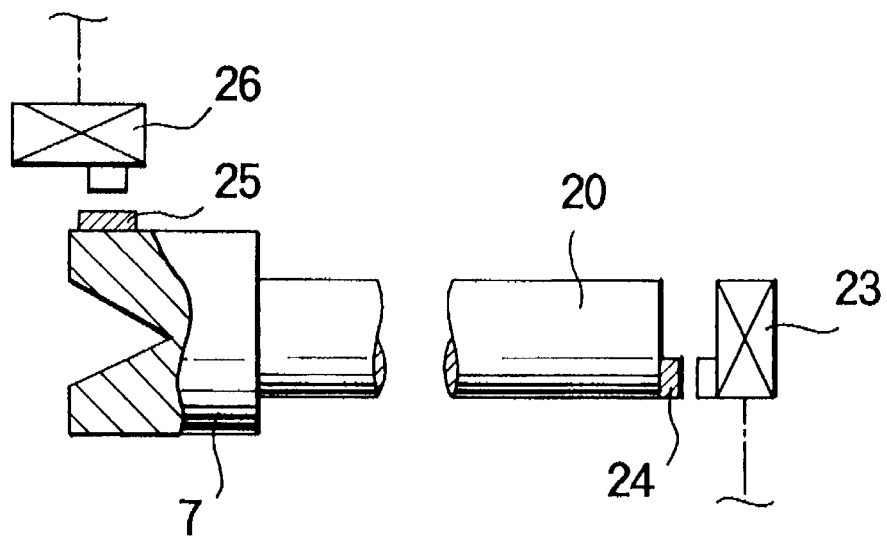
FIG. 2 is a partial explanatory side view illustrating one concrete example of revolution number detecting means contemplated by this invention.
Figure 3:
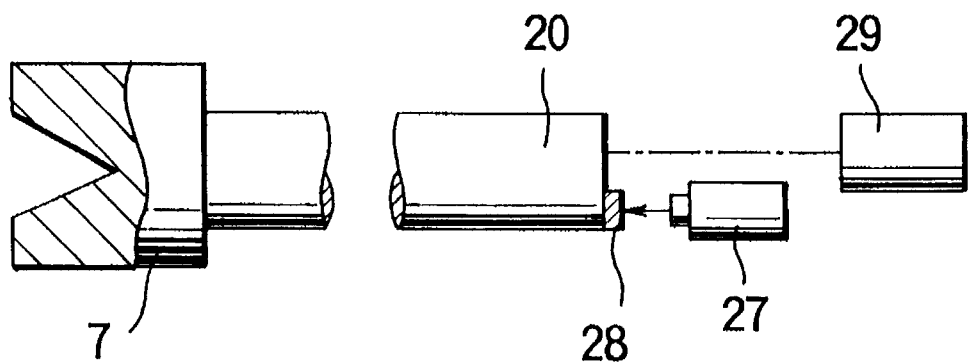
FIG. 3 is a partial explanatory side view illustrating another concrete example of revolution number detecting means contemplated by this invention.
Figure 4:
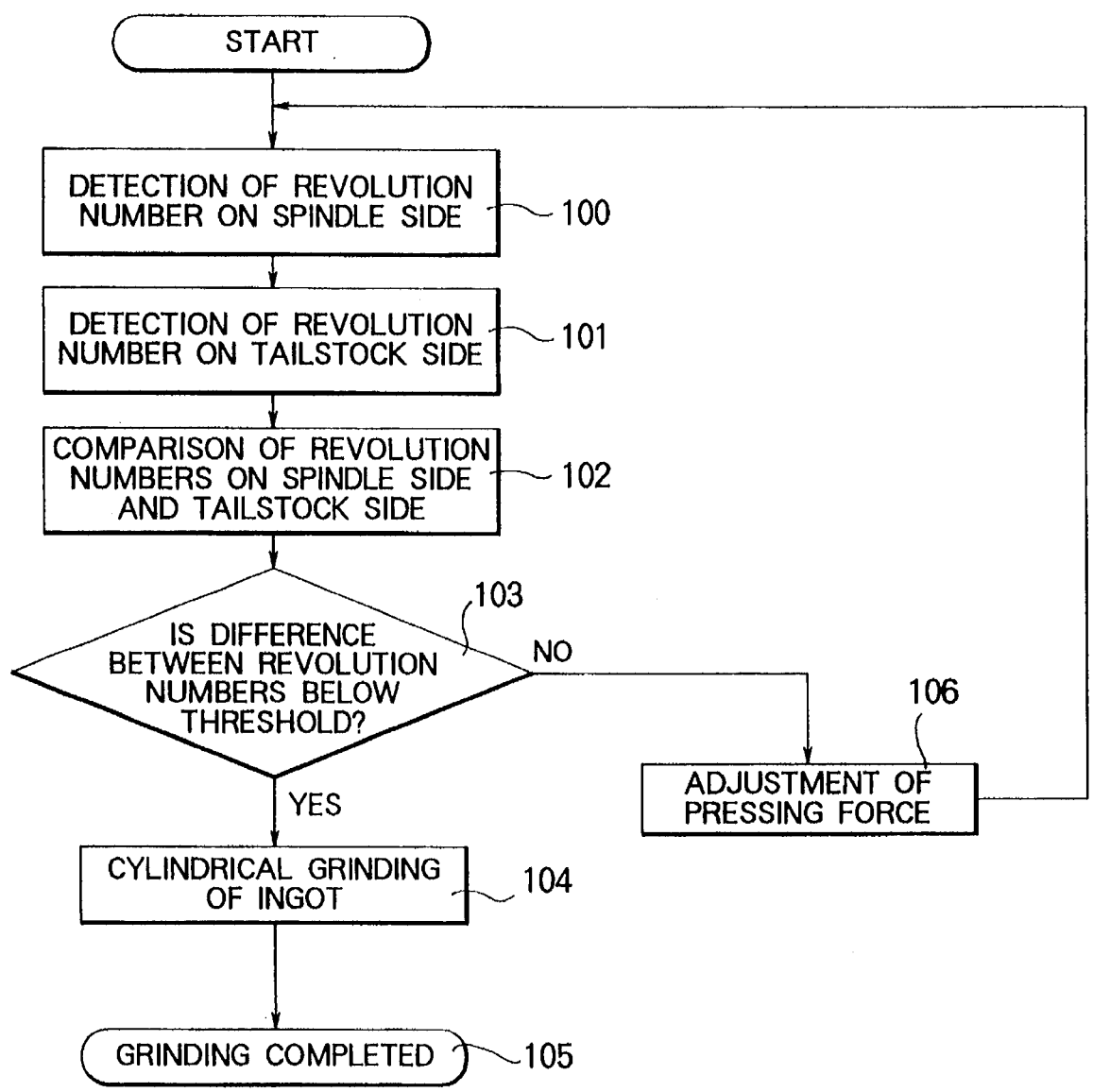
FIG. 4 is a flow chart as an aid in the description of the process of operation of the device in the embodiment of this invention.

Now, one embodiment of this invention will be described below with reference to the accompanying drawing. FIG. 1 is a diagram illustrating the general construction of this embodiment, FIG. 2 and FIG. 3 are partial explanatory side views illustrating concrete examples of the revolution number detecting means, and FIG. 4 is a flow chart as an aid in the description of the operation of the idle rotation preventing device of the present embodiment.

As illustrated in FIG. 1, a spindle side chuck 6 provided with a tapered hole 9 is pivotally supported on a fast head stock 5 and is connected to a drive motor 10. Separately, a tailstock side chuck 7 provided with a tapered hole 11 is supported on a footstock 8. The tapered holes 9 and 11 formed respectively in the spindle side chuck 6 and the tailstock side chuck 7 have smaller angles of inclination than generally conical parts 2 and 3 of a single crystal ingot 1.

Now, pressing means 12 will be described. A cylinder 13 is formed inside the foot stock 8 and a piston 14 connected to the tailstock side chuck 7 is slidably supported on the cylinder 13. Paths 16 and 17 which communicate with a pressure medium supply device 15 are allowed to communicate with two chamber 13a, 13b of the cylinder 13 which are defined by the piston 14. The chamber 13a accommodates a spring 18 which presses the piston 14 toward the single crystal ingot 1.

Revolution number detecting means 19 will be described below. A magnetic chip 21 is fastened to the circumference on the rear end surface of a rod 20 which is interlocked to the piston 14. A magnetism detector 22 fastened on the tailstock 8 side is disposed opposite the magnetic chip 21.

The revolution number detecting means does not need to be limited to what is described above. It may be composed of a photoelectric, magnetic or mechanical switch 23 and a corresponding chip or label 24 which are applied fast to the rear end surface of the rod as shown in FIG. 2. Alternatively, it may be constructed by disposing a chip or label 25 on the outer peripheral side of the tailstock side chuck and setting such a detector as a photoelectric, magnetic or mechanical switch 26 at the position corresponding to that of the chip or level 25. It may be formed otherwise by using a laser 27 and disposing a reflecting member 28 corresponding thereto on the rod 20 side as shown in FIG. 3. It is also permissible to have an encoder 29 interlocked to the rod 20 as shown in FIG. 3 and used for the determination of revolution number. By any of the detectors cited above, the revolution number of the tailstock side chuck 7 can be found.

Control means 30 is so constructed as to compare the revolution number of the tailstock side chuck 7 found by the revolution number detecting means 19 with the revolution number on the fast head stock 5 side, find the difference therebetween, and effect due control of the pressure medium supply device 15 adapted to control the pressing means 12. Further it is so constructed as to control the drive motor 10 on the fast head stock 5 and a grindstone wheel spindle stock 31. The control means 30 is so constructed that when the difference between the revolution number on the spindle side and the revolution number found by the revolution detecting means 19 surpasses the threshold, it actuates the spindle 14 of the pressing means 12, adjusts the pressing force of the tailstock side chuck 7, and effects automatic adjustment for enabling the single crystal ingot 1 to be rotated constantly at the prescribed revolution number.

Figure 8:
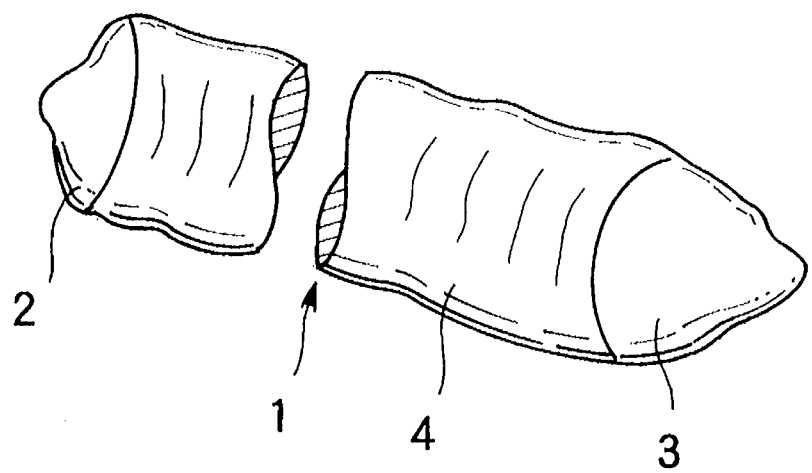
FIG. 8 is a perspective view illustrating the general outline of a single crystal ingot.
Figure 9:
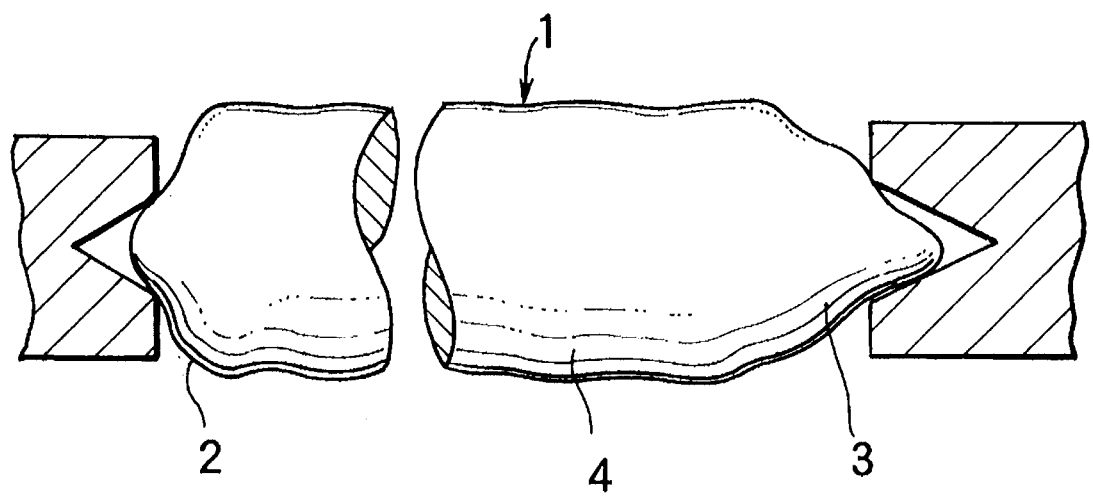
FIG. 9 is a longitudinal cross section illustrating the construction of a support for the single crystal ingot.

Now, the threshold which is used in the present embodiment will be described below. Since the single crystal ingot 1 has a rough surface as shown in FIG. 8 and FIG. 9, it produces idle rotation when the pressing force produced by the pressing means 12 is weak. If the pressing force is unduly strong, the single crystal ingot 1 bends and can no longer be accurately ground, though the idle rotation ceases to exist. Since the single crystal ingot 1 must be supported with moderate pressing force, therefore, it is liable to induce slippage to some extent. Thus, the threshold is adopted as a criterion for discerning whether or not the single crystal ingot 1 is normally rotating. The threshold is arbitrarily set. In the present embodiment in which the single crystal ingot 1 has a diameter in the approximate range of 4 to 8 inches, the threshold is so set that the rotation of the single crystal ingot is judged abnormal when the revolution number on the tailstock side is 1% lower than the prescribed revolution number on the spindle side. In the case of the single crystal ingot 1 having a diameter of 8 inches, for example, the rotation is judged abnormal when the revolution number found by the revolution number detecting means 19 is 7.425 rpm in contrast to the prescribed revolution number which is 7.5 rpm. When the single crystal ingot 1 having a diameter of 4 inches is ground at the prescribed revolution number of 10.5 rpm, the revolution number which is found to be 10.395 rpm is judged abnormal.

Now, the process of operating the idle rotation preventing device set forth in the first aspect of this invention will be described below with reference to the diagram of FIG. 1 and the flow chart of FIG. 4.

First, the revolution number on the spindle side is detected (Step 100) and stored in the control means 30. Then, the revolution number of the tailstock side chuck 7 is detected by the revolution number detecting means 19 (Step 101) and stored in the control means 30. The control means 30 compares the two revolution numbers (Step 102). The control means 30 further examines the difference between the two revolution numbers and determines whether or not this difference is below the threshold (1%) (Step 103). When the difference does not surpass the threshold (yes for selection), the cylindrical grinding of the single crystal ingot 1 is carried out by the grindstone wheel spindle stock 31 (Step 104) and brought to completion (Step 105). Conversely, when this difference surpasses the threshold (no for selection), the control means 30 feeds the pressure medium into the cylinder 13 through the medium of the pressure medium supply device 15 of the pressing means 12 and presses the tailstock side chuck 7 toward the single crystal ingot 1 side to increase the pressing force. Again, the revolution number on the tailstock side is detected. The actions of the preceding steps are repeated until the revolution number so found decreases below the threshold. In consequence of the operation described thus far, the cylindrical grinding of high accuracy is automatically carried out.

Now, the process of operating the idle rotation preventing device which is set forth in the second aspect of this invention will be described below. Like the device of the first aspect of this invention, the device embodying the second aspect of this invention is depicted in FIG. 1. The control means (denoted by the reference numeral of 130 for distinction from the control means 30 used in the embodiment of the first aspect of this invention) effects a control different in nature from the control effected by the control means 30.

Figure 5:
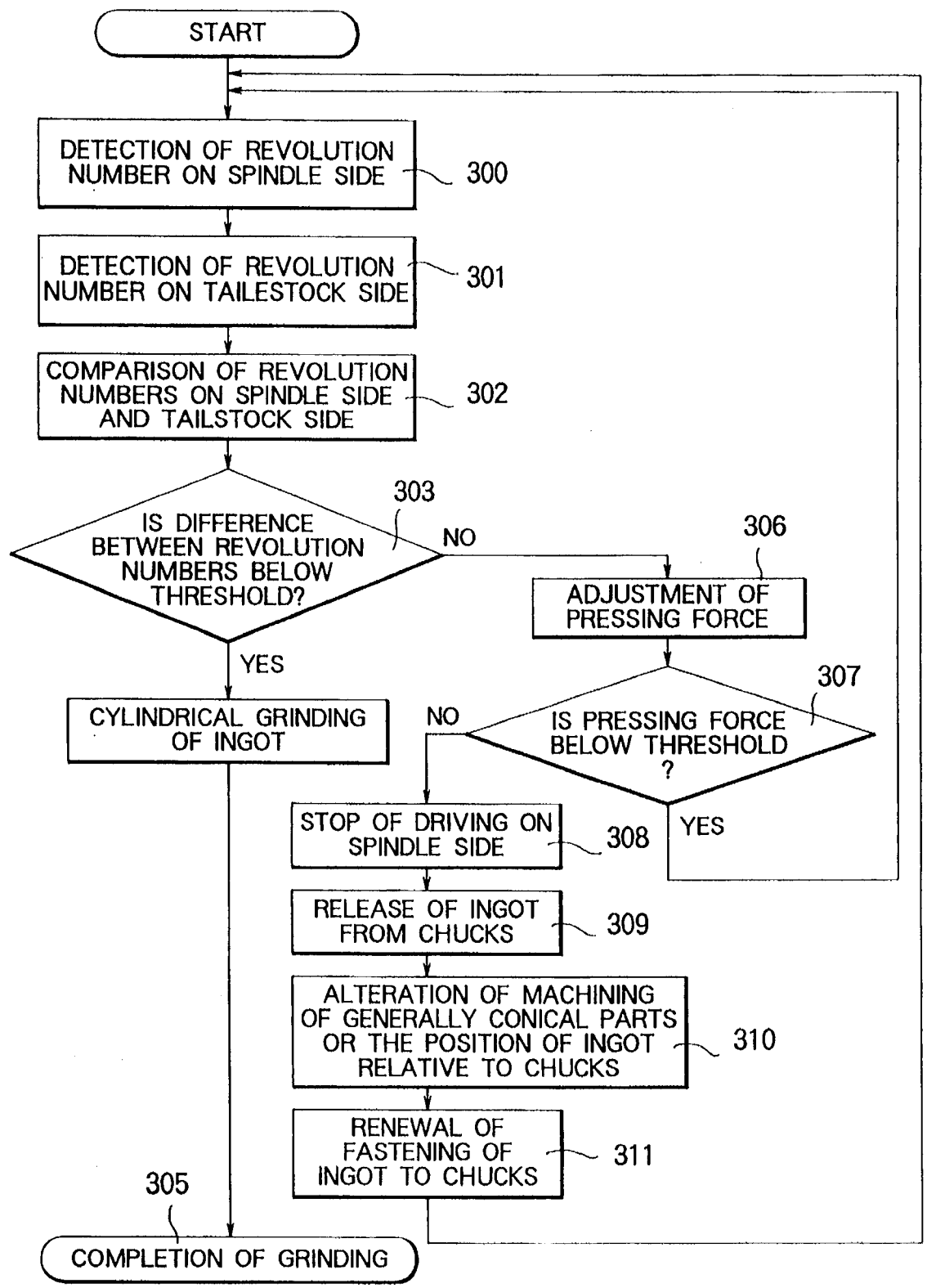
FIG. 5 is a flow chart as an aid in the description of the process of operation of the device in the embodiment of this invention.

To be specific, the control means in the embodiment of the second aspect of this invention controls the pressing force of the pressing means and, at the same time, effects a control so as to stop the driving on the spindle side when the pressing force surpasses the prescribed threshold. The details of the control will be described below with reference to the flow chart of FIG. 5.

When the difference between the two revolution numbers is not within the threshold (no for selection), the control means 130 adjusts the pressing force (Step 306) and examines the pressing force to determine whether or not it surpasses the prescribed threshold (Step 307). So long as the pressing force remains within the threshold, the control means 130 adjusts the pressing force until the difference between the two revolution numbers decreases below the threshold (until the selection draws yes at Step 303). When the selection falls on yes, the work of cylindrical grinding is started on the ingot (Step 304) and brought to completion (Step 305). When the pressing force surpasses the threshold (when the selection draws no at Step 307), the ingot bends and can no longer be ground accurately. Thus, the control means 130 stops the driving on the spindle side by stopping the rotation of the drive motor 10 (Step 308), releases the ingot from the chucks (Step 309), gives a due alteration to the machining of the generally conical parts of the ingot or the chucking position of the ingot (Step 310), renews the attachment of the ingot to the chucks (Step 311), and returns the processing to Step 300.

Figure 6:
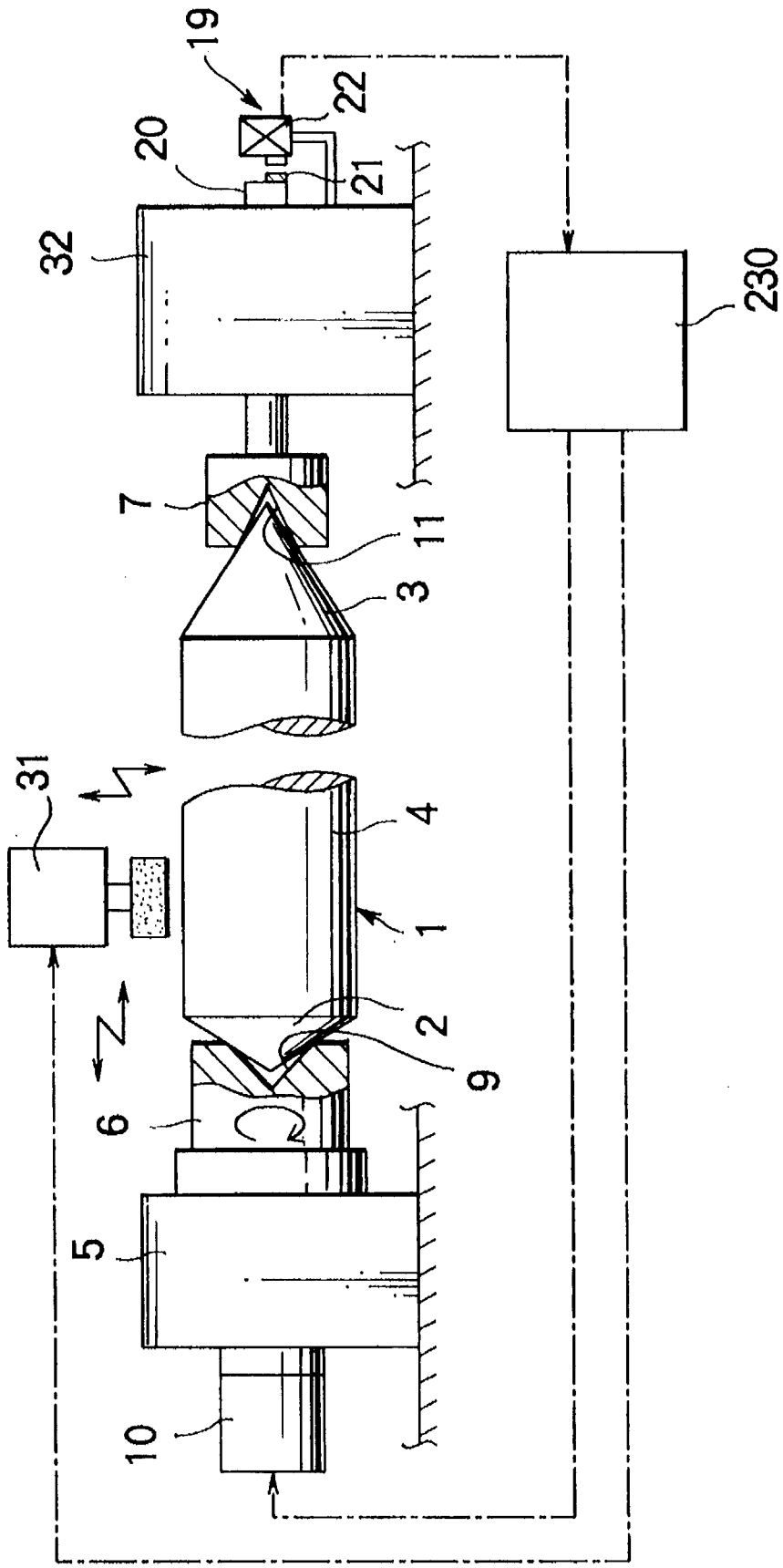
FIG. 6 is a diagram of the general construction of one embodiment of this invention.

Now, the process of operating the idle rotation preventing device set forth in the third aspect of this invention will be described below. FIG. 6 is a diagram of the general construction of one concrete example of the idle rotation preventing device set forth in the third aspect of this invention. This embodiment differs from the embodiment of FIG. 1 in respect that the revolution number of the spindle is compared with the revolution number found by the revolution number detecting means and the driving on the spindle side is stopped when the difference between the two revolution numbers surpasses the prescribed threshold. In FIG. 6, the reference numeral 32 stands for a foot stock.

Figure 7:
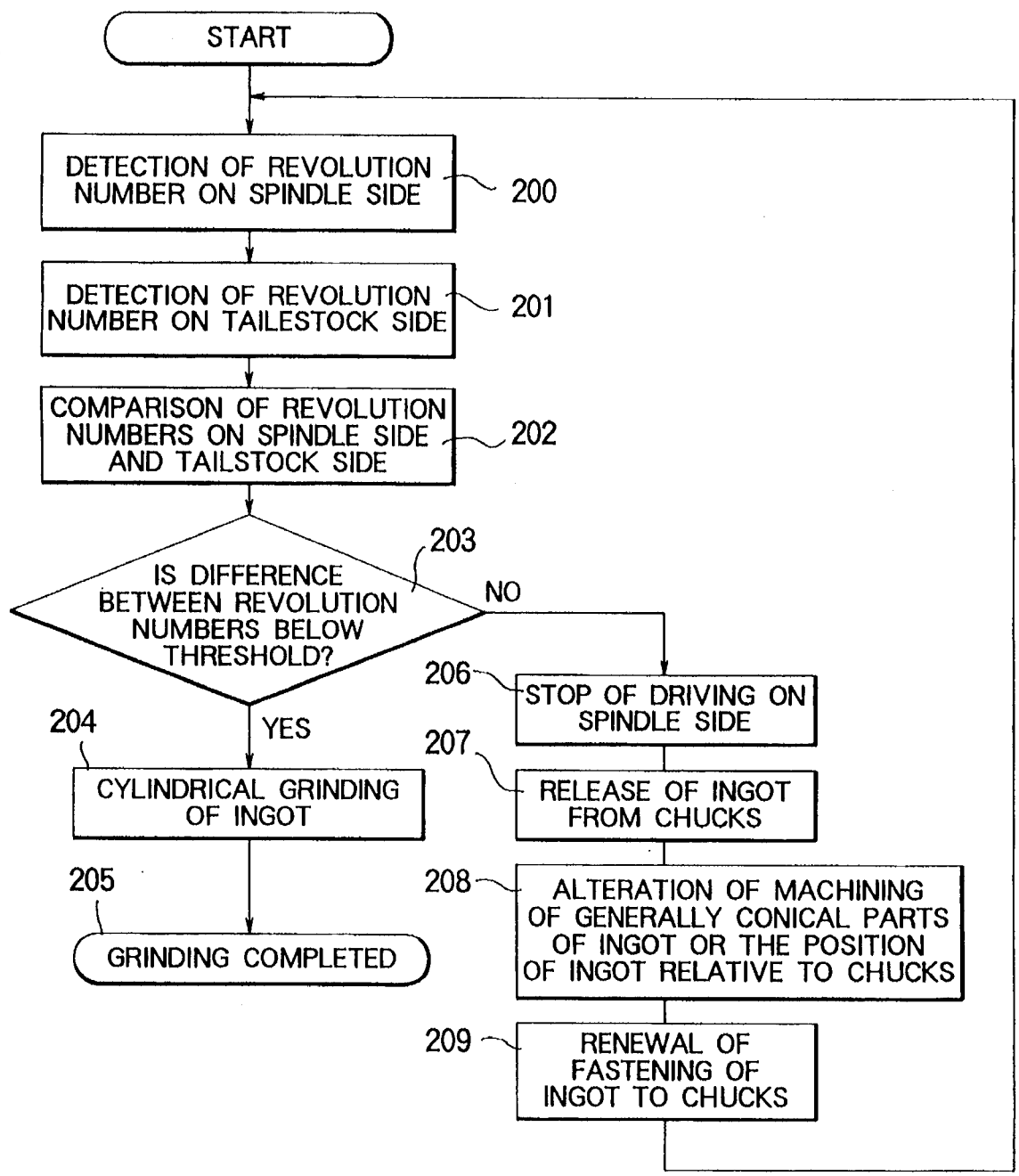
FIG. 7 is a flow chart as an aid in the description of the process of operation of the device in the embodiment of this invention.

To be specific, when the difference between the revolution numbers surpasses the threshold, a control means 230 stops the driving on the spindle side by stopping the rotation of the drive motor (Step 206) as shown in the flow chart of FIG. 7.

Thereafter, the ingot is released from the chucks (Step 207), the machining of the generally conical parts of the ingot and the position of the ingot relative to the chucks are duly altered (Step 208), and the ingot is fastened again to the chucks (Step 209). The processing is returned to Step 200.

When the difference between the revolution numbers is not found to surpass the threshold (yes for selection) at Step 203, the work of cylindrical grinding is started on the ingot (Step 204) and brought to completion (Step 205).

The embodiments described thus far invariably represent cases of using a pressing means 12 which is constructed as illustrated in the relevant diagrams. Naturally, the pressing means 12 does not need to be limited to this particular one. The revolution number detecting means 19 is not limited to what has been described above.

This invention manifests the following prominent effects.

(1) In the idle rotation preventing device set forth in any of aforementioned aspect of this invention, the state of slippage of the single crystal ingot can be confirmed by detecting the revolution number of the tailstock side chuck and comparing the found revolution number with the revolution number on the spindle side because the single crystal ingot is supported in place as compressed between the spindle side chuck and the tailstock side chuck and it is rotated by means of the drive motor on the spindle side. Since the difference between the two revolution numbers is rated against the threshold, an abnormal phenomenon developing in the single crystal ingot is precisely comprehended and the work of cylindrical grinding is prevented from proceeding on the ingot which is in the abnormal state.

(2) In the idle rotation preventing device set forth in any of the aforementioned aspects of this invention, the possible slippage between the single crystal ingot and the tailstock side chuck is eliminated substantially completely and the ingot being machined is prevented from generating vibration by setting the threshold at a low level. Thus, the grinding work is carried out with high accuracy.

(3) In the idle rotation preventing device set forth in the first aspect or second aspect of this invention, the worker attending the device does not require any specially advanced skill in performing the grinding work because the detection of the revolution number and the adjustment of the pressing force based on the outcome of the detection are both fulfilled automatically.

(4) In the idle rotation preventing device set forth in the first aspect or second aspect of this invention, so long as the pressing force generated by the pressing means is below the prescribed threshold and, therefore, is incapable of giving a large bend to the ingot, the pressing force is automatically adjusted so as to remain in the normal state when the difference between the two revolution numbers mentioned above surpasses the threshold. Thus, the single crystal ingot is ground while in the normal state and the work of cylindrical grinding, therefore, is carried out with high accuracy. The driving on the spindle side can be stopped only in the case of genuine abnormality such as is encountered when the idle rotation cannot be prevented solely by the adjustment of the pressing force.

While there have been shown and described present preferred embodiments of the invention, it is to be distinctly understood that the invention is not limited thereto but may be otherwise variously embodied and practiced within the scope of the following claims.

What is claimed is:

1. A device for preventing idle rotation from occurring while turning a cylindrical single crystal ingot, said crystal terminating in generally conical parts at opposite ends thereof comprising:

means for supporting said ingot in place by fastening said conical parts of said ingot to a spindle side chuck and a tailstock side chuck;

each of said chucks provided with a conical hole for receiving said conical parts;

means for grinding and finishing the cylindrical part of said ingot while driving said ingot on the spindle side;

revolution number detecting means adapted to be fastened to said tailstock side chuck for detecting a revolution number thereof;

pressing means on said tail side chuck for pressing said ingot in the axial direction;

control means adapted to compare a revolution number of said spindle side chuck with the revolution number found by said revolution number detecting means; and means for effecting control of said pressing means when a difference between said two revolution numbers surpasses a prescribed threshold.

2. A device for preventing idle rotation from occurring in a single crystal ingot being machined with a cylindrical ingot grinder according to claim 1, wherein said prescribed threshold is 1% lower than the revolution number of said spindle.

3. A device for preventing idle rotation from occurring while turning a cylindrical single crystal ingot, said crystal terminating in generally conical parts at opposite ends thereof comprising;

means for supporting said ingot in place by fastening said conical parts of said ingot to a spindle side chuck and a tailstock side chuck;

each of said chucks provided with a conical hole for receiving said conical parts;

means for grinding and finishing the cylindrical part of said ingot while driving said ingot on the spindle side,;

revolution number detecting means adapted to be fastened to said tailstock side chuck for detecting a revolution number thereof;

pressing means on said tail side chuck for pressing said ingot in the axial direction;

control means adapted to compare a revolution number of said spindle side chuck with the revolution number found by said revolution number detecting means; and means for effecting control of said pressing means when a difference between said two revolution numbers surpasses a prescribed threshold; and means for stopping the driving on the spindle side when the pressing force surpasses a prescribed threshold.

4. A device for preventing idle rotation from occurring in a single crystal ingot being machined with a cylindrical ingot grinder according to claim 3, wherein said prescribed threshold is 1% lower than the revolution number of said spindle.

5. A device for preventing idle rotation from occurring while turning a cylindrical single crystal ingot, said crystal terminating in generally conical parts at opposite ends thereof comprising;

means for supporting said ingot in place by fastening said conical parts of said ingot to a spindle side chuck and a tailstock side chuck;

each of said chucks provided with a conical hole for receiving said conical parts;

means for grinding and finishing the cylindrical part of said ingot while driving said ingot on the spindle side,;

revolution number detecting means adapted to be fastened to said tailstock side chuck for detecting a revolution number thereof;

pressing means on said tail side chuck for pressing said ingot in the axial direction;

control means adapted to compare a revolution number of said spindle side chuck with the revolution number found by said revolution number detecting means; and means for effecting control to stop the driving on the spindle side when a difference between said two revolution numbers surpasses a prescribed threshold.

6. A device for preventing idle rotation from occurring in a single crystal ingot being machined with a cylindrical ingot grinder according to claim 5, wherein said prescribed threshold is 1% lower than the revolution number of said spindle.

7. A device for preventing idle rotation of a single crystal ingot during grinding, and finishing of said cylindrical single crystal ingot, said crystal terminating in generally conical parts, said device comprising in combination:

conical hole portions on a spindle side chuck and a tail side chuck for receiving said ingot conical parts for retaining said ingot;

means for grinding and finishing said cylindrical single crystal ingot;

revolution number detecting means on said tail side for detecting a revolution number;

pressing means on said tail side chuck for pressing said ingot in the axial direction;

control means adapted to compare a revolution number of said spindle side chuck with the revolution number detected by said revolution number detecting means; and means for effecting control of said pressing means when a difference between the revolution number of the spindle side and a revolution number the tail side surpasses a prescribed threshold.

8. A device for preventing idle rotation from occurring in a single crystal ingot according to claim 7 further comprising means for stopping driving of the spindle side when the difference between two revolution numbers surpasses a prescribed threshold.

9. A device for preventing idle rotation from occurring in a single crystal ingot according to claim 8 wherein said threshold is one percent lower than the revolution number of said spindle.

* * * * *